Nov. 14, 1939. G. R. FEIGEL 2,180,290
GEAR ABUTMENT ELIMINATOR
Filed Feb. 21, 1938 2 Sheets-Sheet 1

Inventor:
George R. Feigel
By McLaughlin & Wallenstein
Attorneys

Nov. 14, 1939.　　　　G. R. FEIGEL　　　　2,180,290
GEAR ABUTMENT ELIMINATOR
Filed Feb. 21, 1938　　　2 Sheets-Sheet 2
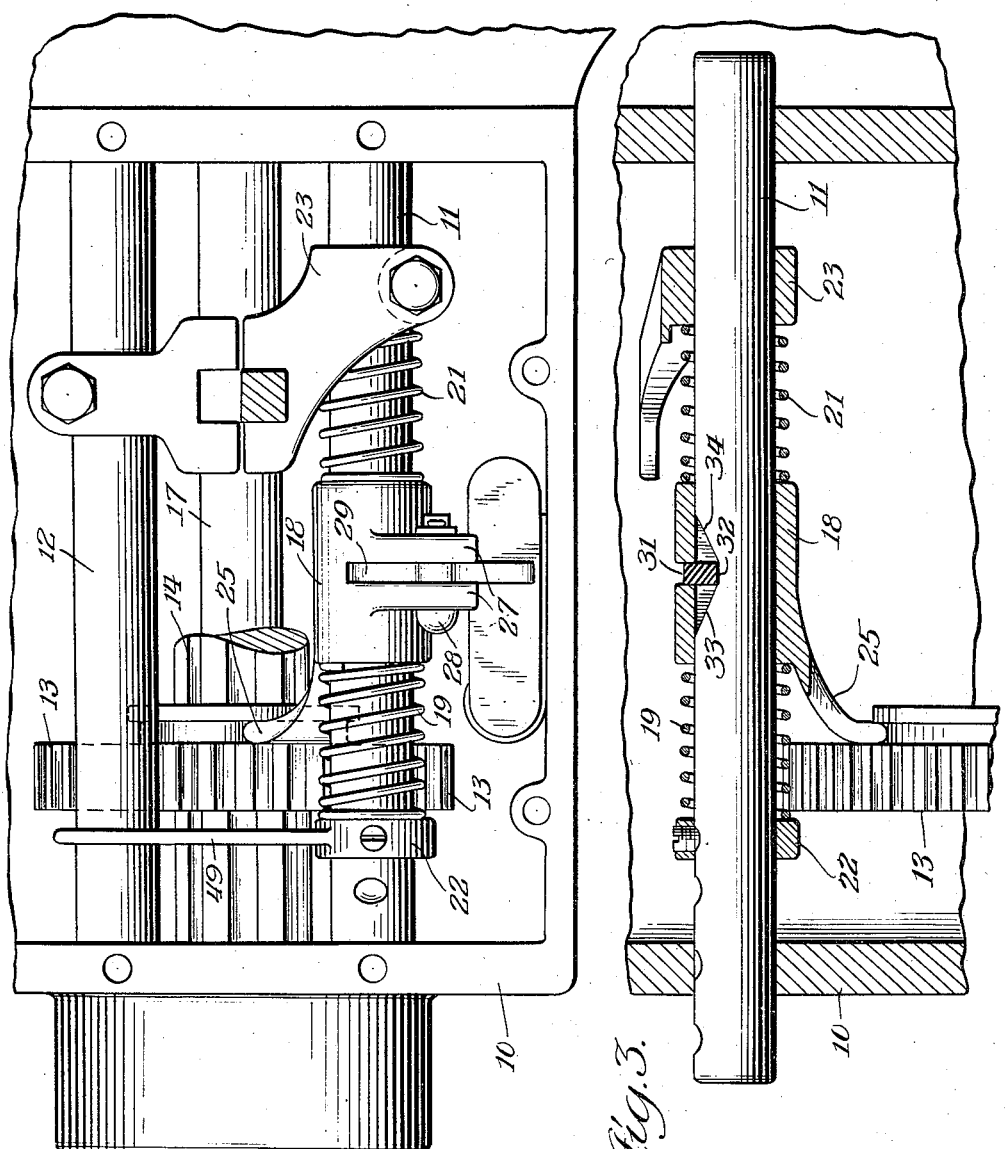
Inventor:
George R. Feigel
By McLaughlin & Wallenstein
Attorneys Patented Nov. 14, 1939

2,180,290

UNITED STATES PATENT OFFICE 2,180,290

GEAR ABUTMENT ELIMINATOR

George R. Feigel, Chicago, Ill., assignor of twenty per cent to McLaughlin & Wallenstein, Chicago, Ill., a firm composed of John J. McLaughlin and Sidney Wallenstein Application February 21, 1938, Serial No. 191,604

14 Claims. (Cl. 74—339)

My invention relates to gear abutment eliminators and is particularly concerned with means for eliminating automatically the abutment of gears in automotive transmissions. It has particular utility in connection with sliding gear transmissions of the selective type where the meshing of gears corresponding to the different forward speeds and reverse speed is accomplished by movement of a sliding gear whose movement, longitudinally of its axis, is controlled by movement of a so-called shifter rail or shifter plate, particularly the former.

When a motor vehicle such as an automobile is at rest, it not infrequently happens that in shifting into first speed or into reverse the first or reverse sliding gear meets an abutment when being moved into mesh. With a manually operated gear shift, this condition is immediately detected since the gear shift lever cannot be moved to its first or reverse position as the case may be. In the case of a manually operated gear shift, no damage to the gears or other mechanism can result. There is, however, the annoyance and inconvenience of manipulating the clutch pedal to bring about a movement of the abutting gear so that the gears can be properly meshed. In the case of power operated gear shifts such as the so-called "Bendix-Hudson" electrically operated or controlled vacuum gear shifter or the "Evans" vacuum operated shifter such as is employed on current models of the Nash automobile, the existence of an abutment of gears remains unknown until the clutch is engaged. In such a situation, there is a possibility of serious damage to the mechanism occurring before the clutch can again be disengaged.

In accordance with my invention, the possibility of gear abutment occurring is simply and effectively eliminated in an automatic manner so that the operator of the vehicle or the like does not even become aware that any abutment has taken place.

It is accordingly one object of my invention to overcome automatically the abutment of gears in change speed mechanisms employing intermeshing gears.

Another object of my invention is the provision of a relatively simple and inexpensive mechanism for eliminating automatically the abutment of gears in automotive transmissions of the selective type having a plurality of forward speeds and a reverse speed.

Still another object of my invention involves the provision of an automatic gear abutment eliminator which may be effectively utilized in power operated automotive transmissions, particularly those of the vacuum operated type.

A still further object of my invention is to provide means for eliminating automatically the abutment of gears in an automobile transmission operating in response to normal movement of the so-called shifter rail or shifter plate which controls the shifting of gears.

Other objects will become apparent in the light of the following detailed description of the invention.

In general, my apparatus operates in response to or as an incident of the usual or normal movement of the shifter rails or plates of a transmission such as the conventional sliding gear transmissions of the selective type having a plurality of forward speeds, usually three, and a reverse speed. When an abutment of gears occurs, resiliently mounted means are set into motion whereby a gear of the cluster which abuts with a sliding gear is given a slight rotatory movement whereby, on continued normal movement of the shifter rail or the like, the gears intermesh.

An illustrative embodiment of my invention is shown in the accompanying drawings wherein Figure 1 is a fragmentary cross section, partly in elevation, of a transmission showing features of my gear abutment eliminator including one way of installing or mounting the same.

Figure 2 is a fragmentary plan view of the transmission, various parts being eliminated in order to show more clearly the novel structure of my invention.

Figure 3 is a cutaway view, partly in section, showing details of my novel mechanism in relation to one of the shifter rails.

Figure 1:
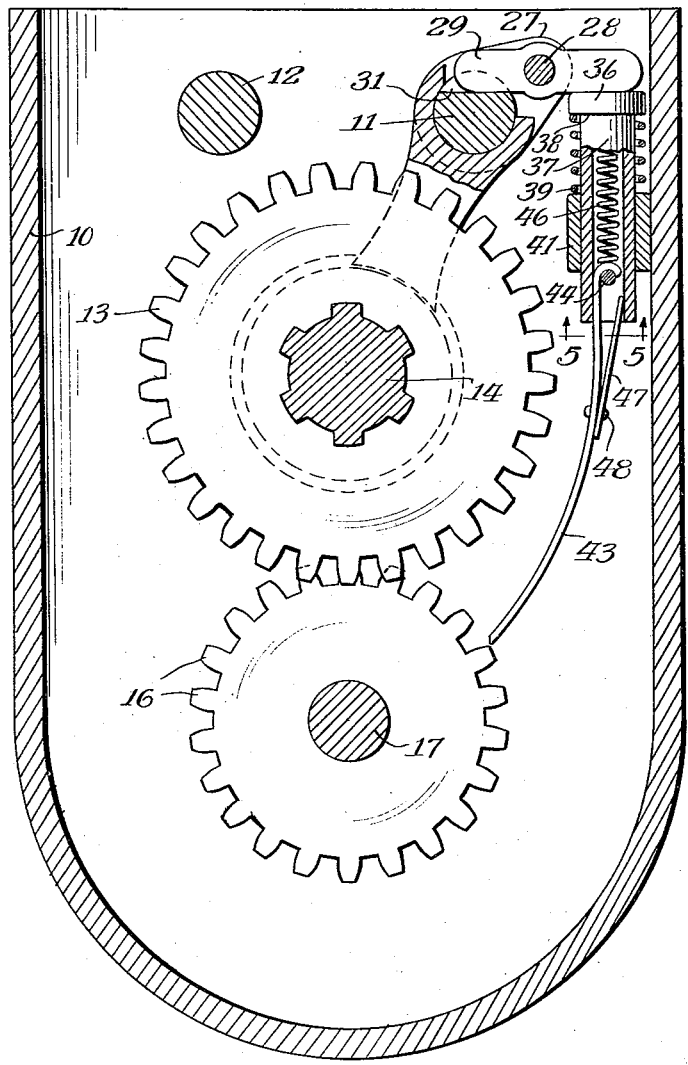
Figure 4:
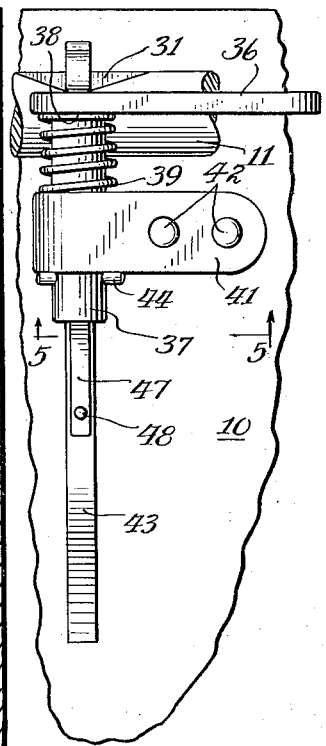
Figures 4 and 5 show details of my device.
Figure 5:
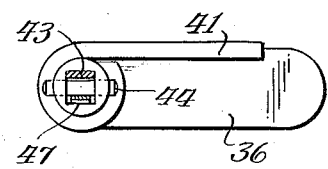

As shown in Figures 1 and 2, numeral 10 represents the usual transmission case of an automobile or similar vehicle mounted within which are the conventional shifter rails 11 and 12, the shifter rail 11 serving to control first forward speed and reverse speed and the shifter rail 12 serving to control second and third forward speeds. The mechanism of my invention is described in conjunction with the first and reverse shifter rail 11 and, hence, no further reference will be made to shifter rail 12 except as incidental to the main description which follows. The first and reverse sliding gear 13 is mounted in the usual way on a shaft 14 and is adapted to mesh with gears of the gear cluster, in the present instance, only the first speed gear 16 mounted on the shaft 17 being shown herein.

Mounted on the shifter rail 11 is an encircling sleeve 18 which, under conditions where an abutment of gears occurs, is adapted to move or slide on said shifter rail 11 longitudinally of its axis. Under normal conditions, however, that is, where no abutment of gears occurs when shifting, for example, into first speed or reverse, the sleeve 18 moves together with the shifter rail 11 and not relative thereto. This relationship is brought about by the employment of springs 19 and 21 and cooperating elements which are shortly to be described. The spring 19 encircles the shifter rail 11 and is disposed between one end of the sleeve 18 and a collar 22 which is fixed or immovably fastened to the shifter rail 11. The spring 21 encircles the shifter rail 11 and is disposed between the other end of the sleeve 18 and the motivated arm 23 which is also fixedly attached to the shifter rail 11. Integral with or suitably attached to the sleeve 18 so as to be movable therewith is a shifter arm 25 which serves to effect sliding movement of the sliding gear 13 as in conventional automotive transmissions.

The sleeve 18 is provided with ears 27, and a pin 28 passes therethrough and serves to pivotally support a rocker arm 29. As will be seen from Figures 1 and 3, the shifter rail 11 is provided with a cam surface which is formed with a lowermost portion 32 and upwardly sloping side portions 33 and 34. The sleeve 18 is provided with a slot or cut-out portion through which one end of the rocker arm 29 projects. It will be understood that the compressive strengths of the springs 19 and 21 are such as to maintain the sleeve 18 in its normal or central position over the cam surface 31 under ordinary conditions, that is, when no abutment of gears occurs, said end of the rocker arm 29 resting in the lowermost portion 32 of the cam surface under such conditions.

The other end of the rocker arm 29 rests upon a resiliently supported plate or tappet 36 which is provided with a downwardly extending or depending hollow member 37, a shoulder 38 being formed between the tappet 36 and the member 37 whereby a spring 39 is supported between said shoulder 38 and a mounting bracket 41 which is conveniently mounted on the inside of the transmission case 10 in any suitable manner, as shown in Figures 1 and 2, as, for example, by means of bolts which pass through the openings 42 in the mounting bracket 41. The member 37 is supported for sliding movement in the bracket 41 and the spring 39 normally urges the tappet 36, the member 37 and the end of the arm 29 with which it is in contact upwardly. In normal position, therefore, one end of the rocker arm 29 rests on the lowermost portion 32 of the cam surface and the other end of said rocker arm rests on the tappet 36.

Mounted in the lower part of the member 37 is an arm or pushrod 43 which is retained therein by a pin 44, the arm 43 and the spring 47, which are held together by the pin 48, serving to hold said arm 43 in position. The spring 47 permits the arm 43 to follow the arc of the gear 16 and the spring 46 constitutes a safety release in case there should be an accidental reverse rotation of the gear 16.

Attached to the collar 22 is an arm 49 having an opening at its end through which the second and third speed shifter rail 12 passes. This arrangement insures against any possible rotary motion of the first and reverse shifter rail 11.

*Operation*

Assume that the automobile or other vehicle or the like is at rest and the gears of the transmission are in such a position that upon sliding the gear 13 toward the gear 16 an abutment takes place. A shift into first speed is commenced whereupon the motivated arm 23, which is fixed to the first and reverse shifter rail 11, moves toward the right (Fig. 2). This movement results in a movement of the entire assembly which is mounted on the first and reverse shifter rail 11 and a sliding movement of the sliding gear 13 toward the right. When the gear 13 abuts against the gear 16, as shown in Fig. 1, further movement of the gear 13 towards the right and further movement of the sleeve 18 towards the right cannot occur although the first and reverse shifter rail 11 continues to move to the right. This continued movement of the shifter rail 11 compresses the spring 19 and, in addition, causes the end of the rocker arm 29, resting at the bottom 32 of the cam surface, to move up the incline or sloping surface 33. The opposite end of the rocker arm 29 thereupon is depressed and forces the tappet 36 downwardly against the action of the spring 39. The downward movement of the tappet 36 causes the arm or pushrod 43 to come into contact with the teeth of the gear 16 whereupon the gear 16 is rotated to an extent to eliminate the abutment. The compressed spring 19 thereupon expands and moves the sliding gear 13 into mesh with the gear 16 of the cluster.

As the spring 19, through the sleeve 18 and the shifter arm 25, moves the gears 13 and 16 into mesh, the rocker arm 29 descends to the bottom 32 of the cam surface, in other words, into its normal position. When the pressure on the top of the tappet 36 is thus released, the spring 39 moves the pushrod 43 upwardly and out of contact with the gear 16.

Upon meeting an abutment when shifting into reverse, the operation is the same as described with the exception that the shifter rail 11 moves to the left (Fig. 2), the spring 21 is compressed, and the rocker arm 29 moves on the sloping portion 34 of the cam surface.

It will be understood that, where no abutment of gears occurs in shifting into either first speed or reverse, the first and reverse shifter rail operates in the same way as the conventional shifter rail in the usual transmissions.

While I have described my novel gear abutment eliminator in use in a transmission employing shifter rails, it is obvious that it may be utilized in transmissions using shifter plates instead of shifter rails. The appended claims will, therefore, be understood to cover my novel teachings in a broad sense.

What I claim as new and desire to protect by Letters Patent of the United States is:

1. In a transmission having a plurality of forward speeds and a reverse speed, a sliding gear controlled first speed and reverse, a second gear adapted to mesh with said sliding gear, a shifting mechanism to cause movement of said sliding gear longitudinally of its axis, means operated by the movement of said shifting mechanism to impart rotary movement to said second gear to an extent sufficient to cause said sliding gear to mesh with said second gear, and means whereby said last-mentioned means is brought into operation only when said second gear is at rest.

2. In a gear abutment eliminator, the combination with a sliding gear, which is adapted to mesh with a second gear, of a shifter rail, means operated by the normal movement of said shifter rail to impart rotary movement to said second gear to an extent sufficient to cause said sliding gear to mesh with said second gear, and means whereby said last-mentioned means is brought into operation only when said second gear is at rest.

3. In a gear abutment eliminator, the combination with a sliding gear, which is adapted to mesh with a second gear, of a shifter rail, resiliently mounted means operated by the normal movement of said shifter rail to impart rotary movement to said second gear to an extent sufficient to cause said sliding gear to mesh with said second gear, and means whereby said last-mentioned means is brought into operation only when said second gear is at rest.

4. In a gear abutment eliminator, in combination, a sliding gear transmission of the selective type having a plurality of forward speeds and a reverse speed and wherein first speed and reverse are effected by movement of a sliding gear longitudinally of its axis and which is adapted to mesh with a second gear, a shifter rail operatively connected to effect sliding movement of said sliding gear, means operated by the normal movement of said shifter rail to impart rotary movement to said second gear to an extent sufficient to cause said sliding gear to mesh with said second gear, and means whereby said last-mentioned means is brought into operation only when said second gear is at rest.

5. In a gear abutment eliminator, the combination with a sliding gear, which is adapted to mesh with a second gear, of means to cause sliding movement of said sliding gear, resiliently mounted means operated by the normal movement of said first mentioned means to impart rotary movement to said second gear to an extent sufficient to cause said sliding gear to mesh with said second gear, and means whereby said resiliently mounted means is brought into operation only when said second gear is at rest.

6. In a gear abutment eliminator, in combination, a sliding gear transmission of the selective type having a plurality of forward speeds and a reverse speed and wherein first speed and reverse are effected by movement of a sliding gear longitudinally of its axis and which is adapted to mesh with a second gear, a shifter rail operatively connected to effect sliding movement of said sliding gear, an arm which is adapted to contact said second gear to rotate the same when said sliding gear abuts therewith, and means operated in response to normal movement of said shifter rail to impart movement to said arm to effect rotation of said second gear to an extent sufficient to cause said sliding gear to mesh with said second gear.

7. In a gear abutment eliminator, in combination, a sliding gear transmission of the selective type having a plurality of forward speeds and a reverse speed and wherein first speed and reverse are effected by movement of a sliding gear longitudinally of its axis and which is adapted to mesh with a second gear, a shifter rail operatively connected to effect sliding movement of said sliding gear, a resiliently mounted arm which is adapted to contact said second gear to rotate the same when said sliding gear abuts therewith, and resiliently mounted means operated in response to normal movement of said shifter rail to impart movement to said arm to effect rotation of said second gear to an extent sufficient to cause said sliding gear to mesh with said second gear.

8. In an automobile transmission having a plurality of forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, a spring-mounted sleeve encircling said shifter rail and connected to said shifter arm, said sleeve and said shifter arm being adapted to move longitudinally with respect to said shifter rail, means operated by the movement of said shifter rail to impart rotary movement to said second gear to an extent sufficient to cause said sliding gear to mesh with said second gear, and means whereby said last-mentioned means is brought into operation only when said second gear is at rest.

9. In an automobile transmission having a plurality of forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, a sleeve at least partially encircling said shifter rail and connected to said shifter arm, said sleeve and said shifter arm being adapted to move longitudinally with respect to said shifter rail, springs encircling said shifter rail and disposed at opposite sides of said sleeve, the strength of said springs being such as to maintain the sleeve in a predetermined position on said shifter rail in the absence of an abutment of gears, and means operated in response to movement of said shifter rail to impart rotary movement to said second gear, when an abutment occurs, to an extent sufficient to cause said sliding gear to mesh with said second gear.

10. In an automobile transmission having a plurality of forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, a spring-mounted sleeve encircling said shifter rail and connected to said shifter arm, said sleeve and said shifter arm being adapted to move longitudinally with respect to said shifter rail, a cam surface on said shifter rail, a rocker arm pivoted to an extension on said sleeve and one end of which rocker arm passes through a slot in said sleeve so as to contact a part of said cam surface, and means cooperating with said rocker arm and operated in response to movement of said shifter rail to impart rotary movement to said second gear, when an abutment occurs, to an extent sufficient to cause said sliding gear to mesh with said second gear.

11. An automobile transmission having a casing, a plurality of gears controlling forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, a spring-mounted sleeve encircling said shifter rail and connected to said shifter arm, said sleeve and said shifter arm being adapted to move longitudinally with respect to said shifter rail, springs encircling said shifter rail and abutting against said sleeve at opposite sides thereof, a cam surface on said shifter rail which is provided with a lowermost portion and upwardly sloping sides, a spring supported arm suitably mounted in said casing, a rocker arm passing through a slot formed in said sleeve and normally resting on the lowermost portion of said cam surface, said rocker arm serving to depress said spring supported arm when an abutment of said gears occurs in response to normal movement of said shifter rail whereby rotary movement is imparted to said second gear to an extent sufficient to cause said sliding gear to mesh with said second gear.

12. In an automobile transmission having a plurality of forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, a spring-mounted sleeve encircling said shifter rail and connected to said shifter arm, said sleeve and said shifter arm being adapted to move longitudinally with respect to said shifter rail, a spring mounted arm and means operated in response to normal movement of said shifter rail to actuate said spring mounted arm whereby rotary movement is imparted to said second gear, when an abutment occurs, to an extent sufficient to cause said sliding gear to mesh with said second gear.

13. In an automobile transmission having a plurality of forward speeds and a reverse speed, a sliding gear which controls first speed and reverse, a second gear which is adapted to mesh therewith, a shifter rail, a shifter arm which is adapted to move with said shifter rail and to cause sliding movement of said sliding gear, means for eliminating automatically the abutment of said gears including a spring-mounted sleeve encircling said shifter rail and connected to said shifter arm, said sleeve and said shifter arm being adapted to move longitudinally with respect to said shifter rail, a cam surface on said shifter rail, a spring mounted tappet and a gearing moving arm operable thereby, and a pivoted rocker arm which, when an abutment of said gears takes place, acts upon said tappet to depress said gear moving arm in response to normal movement of said shifter rail whereby to impart rotary movement to said second gear to an extent sufficient to cause said sliding gear to mesh with said second gear.

14. In a gear abutment eliminator, the combination with a sliding gear, which is adapted to mesh with a second gear, of a shifting mechanism to cause movement of said sliding gear longitudinally of its axis, and means operated in response to normal movement of said shifting mechanism to impart rotary movement to said second gear to an extent sufficient to cause said sliding gear to mesh with said second gear, said means being brought into operation only when an abutment of said gears occurs.

GEORGE R. FEIGEL.